(No Model.)
D. C. SWEET.
FEED ROLLER.
No. 420,522. Patented Feb. 4, 1890.
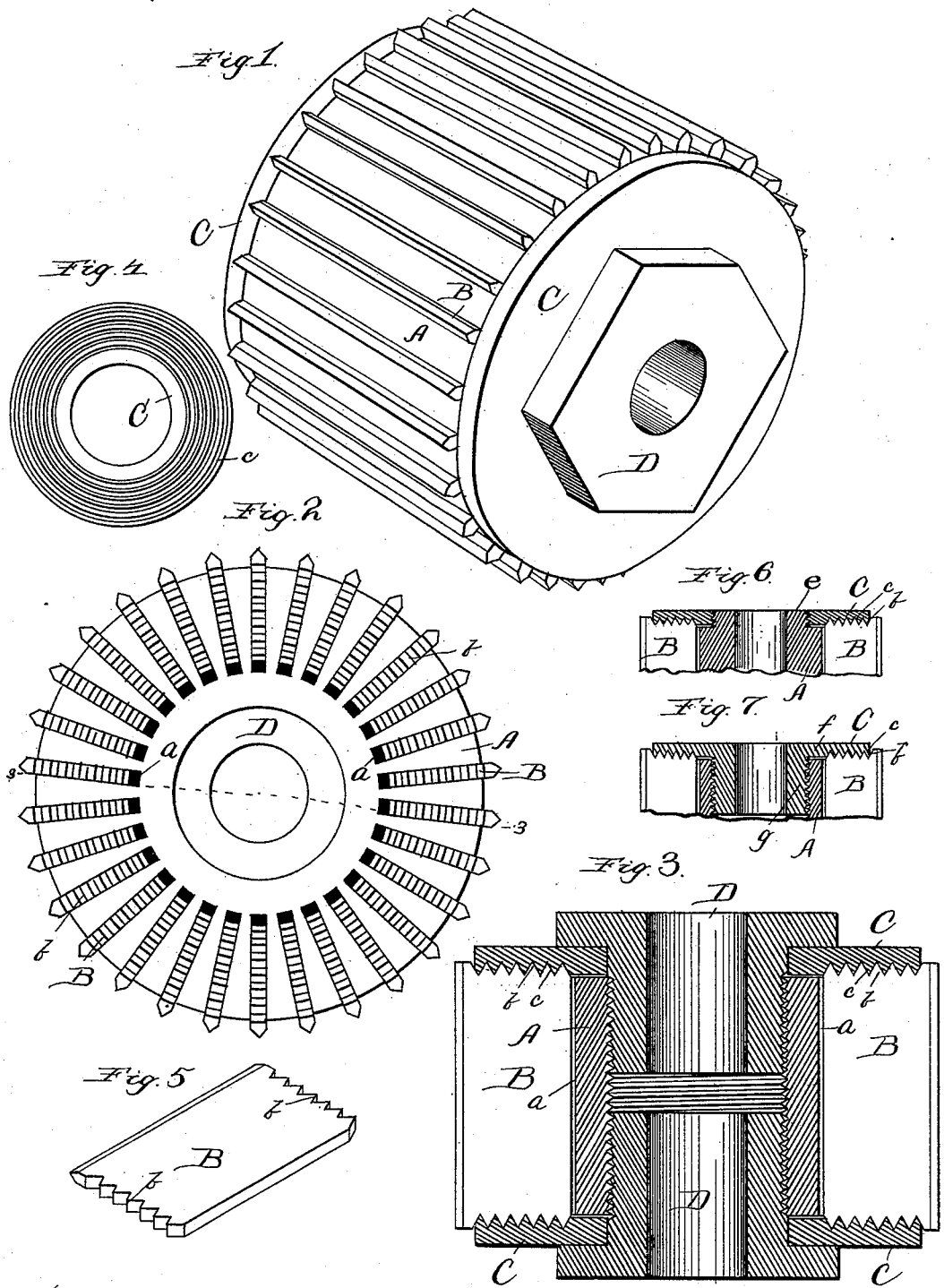
Witnesses:
Geo. C. Curtis.
H. W. Munday
Inventor:
David C. Sweet
By Munday Evarts & Adcock
his Attorneys

UNITED STATES PATENT OFFICE.

DAVID C. SWEET, OF CHICAGO, ILLINOIS.

FEED-ROLLER.

SPECIFICATION forming part of Letters Patent No. 420,522, dated February 4, 1890.

Application filed September 23, 1889. Serial No. 324,750. (No model.)

*To all whom it may concern:*

Be it known that I, DAVID C. SWEET, a citizen of the United States, residing in Chicago, in the county of Cook and State of Illinois, have invented a new and useful Improvement in Feed-Rollers, of which the following is a specification.

This invention relates to the construction of the feed-rolls used in wood-working machines, and is designed to render it a matter of ease and a short space of time to replace any of the teeth which may become broken or require sharpening. It is also more easy of manufacture than other rolls of the same general character now in use. While the invention has been designed chiefly with a view to its use in wood-working machinery, it is also applicable to other classes of machines.

My improved feed-roll consists of a wheel provided with radial slots adapted to receive the teeth, and with means—such, for instance, as removable heads or ends—adapted to hold the teeth in said slots.

The invention further consists in a radially-slotted wheel, teeth adapted to be inserted in the slots of the wheel and provided with end projections, and heads secured to the wheel and locking with the projections of the teeth.

These and other features of my invention are fully illustrated in the accompanying drawings, in which—

Figure 1 is a perspective of my improved feed-roll. Fig. 2 is an end view of the wheel with the head which locks the teeth removed. Fig. 3 is a central section of the roll upon the line 3 3 of Fig. 2. Fig. 4 is an inside view of one of the heads. Fig. 5 shows one of the teeth detached. Figs. 6 and 7 are modifications of the construction shown in the main figures.

In said drawings, A represents a wheel forming the body of the roll, and provided with a series of radial slots $a$, each of which slots is adapted to receive a steel tooth, such as that shown at B. For the purpose of locking the teeth in the slots I provide the wheel with heads C, which will bear upon the ends of the teeth and clamp them in place. I prefer, however, to provide the ends of the teeth with projections, corrugations, or indentations—such, for instance, as those illustrated at $b$—and to so fashion the inner faces of the heads that they will receive or engage with such projections or corrugations. A desirable construction is illustrated for these interfitting projections and recesses, the heads being provided with a series of annular grooves $c$, corresponding with the projections $b$ upon the teeth, so that the teeth may be locked in various positions, and be thus rendered adjustable. This feature permits the moving of the teeth outward as their operating edges are worn or ground away without affecting the security with which they are held.

The heads C may be secured to the wheel in a number of ways. I prefer to employ hollow bolts D, one at either end of the wheel, which may be threaded in the interior of the wheel, as shown at Fig. 3. The threaded bolts may, however, be dispensed with and threaded hubs $e$ be formed on the wheel, to which the heads may be screwed, as shown at Fig. 6. A second modification is illustrated at Fig. 7, and in this the end plate is made in one piece with the hollow bolt, as shown at $f g$.

It will be noticed that the teeth can be readily inserted and removed from my improved roll, and that each tooth is secured so as to be independent of the others.

In taking out and adjusting the teeth it is only necessary to remove one of the heads C. Hence in the manufacture of the roller one of the heads C can be permanently secured in place upon the wheel.

I claim—

1. The improved feed-roll consisting of a wheel provided with a series of radial slots, a series of teeth inserted in said slots, and adjustable outward and inward, and means for holding the teeth in the wheel, substantially as set forth.

2. The radially-slotted wheel, in combination with teeth provided with projections at their ends and inserted in the slots of the wheel, and heads or end pieces, one or both of which are removable and are provided with a series of indentations to receive the projections upon the teeth, whereby the teeth are both rigidly held and rendered adjustable, substantially as set forth.

3. The radially-slotted wheel and teeth having projections upon their ends and adapted to be inserted in the slots of the wheel, in combination with heads or end pieces adapted to be secured to the wheel and provided with indentations engaging with the projections at the ends of the teeth, substantially as set forth.

4. The radially-slotted wheel, the teeth inserted in the slots of the wheel and having projections, corrugations, or indentations on their ends, in combination with heads adapted to be secured to the wheel and provided with recesses or grooves $c$, substantially as set forth.

DAVID C. SWEET.

Witnesses:
H. M. MUNDAY,
E. J. REYNOLDS.